US009678979B1

(12) United States Patent
Li et al.

(10) Patent No.: US 9,678,979 B1
(45) Date of Patent: Jun. 13, 2017

(54) COMMON BACKUP FORMAT AND LOG BASED VIRTUAL FULL CONSTRUCTION

(71) Applicant: EMC Corporation, Hopkinton, MA (US)

(72) Inventors: Junxu Li, Pleasanton, CA (US); Windsor W. Hsu, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 611 days.

(21) Appl. No.: 13/956,237

(22) Filed: Jul. 31, 2013

(51) Int. Cl.
*G06F 17/30* (2006.01)
(52) U.S. Cl.
CPC .............. *G06F 17/30174* (2013.01)
(58) Field of Classification Search
CPC ............................ G06F 17/30174
USPC .......................................... 707/624
See application file for complete search history.

(56) References Cited

U.S. PATENT DOCUMENTS

| | | | |
|---|---|---|---|
| 6,173,291 B1 | 1/2001 | Jenevein | |
| 6,477,613 B1 | 11/2002 | Arimilli et al. | |
| 6,708,188 B1 | 3/2004 | Bear et al. | |
| 7,546,323 B1 | 6/2009 | Timmins et al. | |
| 8,055,613 B1 * | 11/2011 | Mu | G06F 11/1451 707/610 |
| 8,099,572 B1 | 1/2012 | Arora et al. | |
| 8,495,022 B1 * | 7/2013 | Zhu | G06F 11/1451 707/645 |
| 8,566,297 B1 | 10/2013 | Dowers et al. | |
| 8,909,605 B1 | 12/2014 | Li | |
| 2002/0032691 A1 | 3/2002 | Rabii et al. | |
| 2004/0158455 A1 | 8/2004 | Spivack et al. | |
| 2006/0235847 A1 * | 10/2006 | Farlee | G06F 11/1466 |
| 2006/0259949 A1 | 11/2006 | Schaefer et al. | |
| 2006/0271567 A1 * | 11/2006 | Jain | G06F 17/2205 |
| 2013/0198854 A1 * | 8/2013 | Erway | H04L 9/008 726/27 |
| 2013/0325814 A1 | 12/2013 | Carter | |

* cited by examiner

*Primary Examiner* — Mahesh Dwivedi
*Assistant Examiner* — Johnese Johnson
(74) *Attorney, Agent, or Firm* — Blakely, Sokoloff, Taylor & Zafman LLP

(57) ABSTRACT

Systems and methods are described for backing up files and directories using a common backup format. The files and directories may be represented by objects within a data stream constructed using the common backup format. The data streams may be traversed and updated using a size tree such that modifications are made to individual objects within the data streams without complete traversal. This process results in efficient management of storage systems as read and write operations are not dependent on exhaustive traversal of data streams.

30 Claims, 18 Drawing Sheets

COMMON BACKUP FORMAT AND LOG BASED VIRTUAL FULL CONSTRUCTION

RELATED APPLICATIONS

This application is related to co-pending application Ser. No. 13/956,217, filed Jul. 31, 2013 which is incorporated by reference herein in its entirety.

FIELD OF THE INVENTION

Embodiments of the present invention relate generally to data storage systems. More particularly, embodiments of the invention relate to constructing data streams and structures that improve the efficiency of backup and virtual full construction.

BACKGROUND

Data storage utilization is continually increasing, causing the proliferation of storage system in data centers. In order to reduce storage space of a storage system, deduplication techniques are utilized, where data objects or files are segmented in chunks and only the deduplicated chunks are stored in the storage system.

Current techniques and systems for storing data do not allow for the efficient identification and analysis of files and other objects in a data stream associated with a stored file system. In particular, current file storage formats do not facilitate the efficient insertion of markers into data streams to assist in the performance of deduplication heuristics based processing.

Additionally, as changes are made to elements of a data stream, the location of files and objects within the data stream change over time. Accordingly, efficient access to each particular object in a data stream for both read and write applications requires a traversal of the entire data stream to locate a desired object. This process results in inefficient management of the storage system as read and write operations are dependent on exhaustive traversal of the data stream.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other. A "set," as used herein refers to any positive whole number of items including one item.

System Configuration

Figure 1:
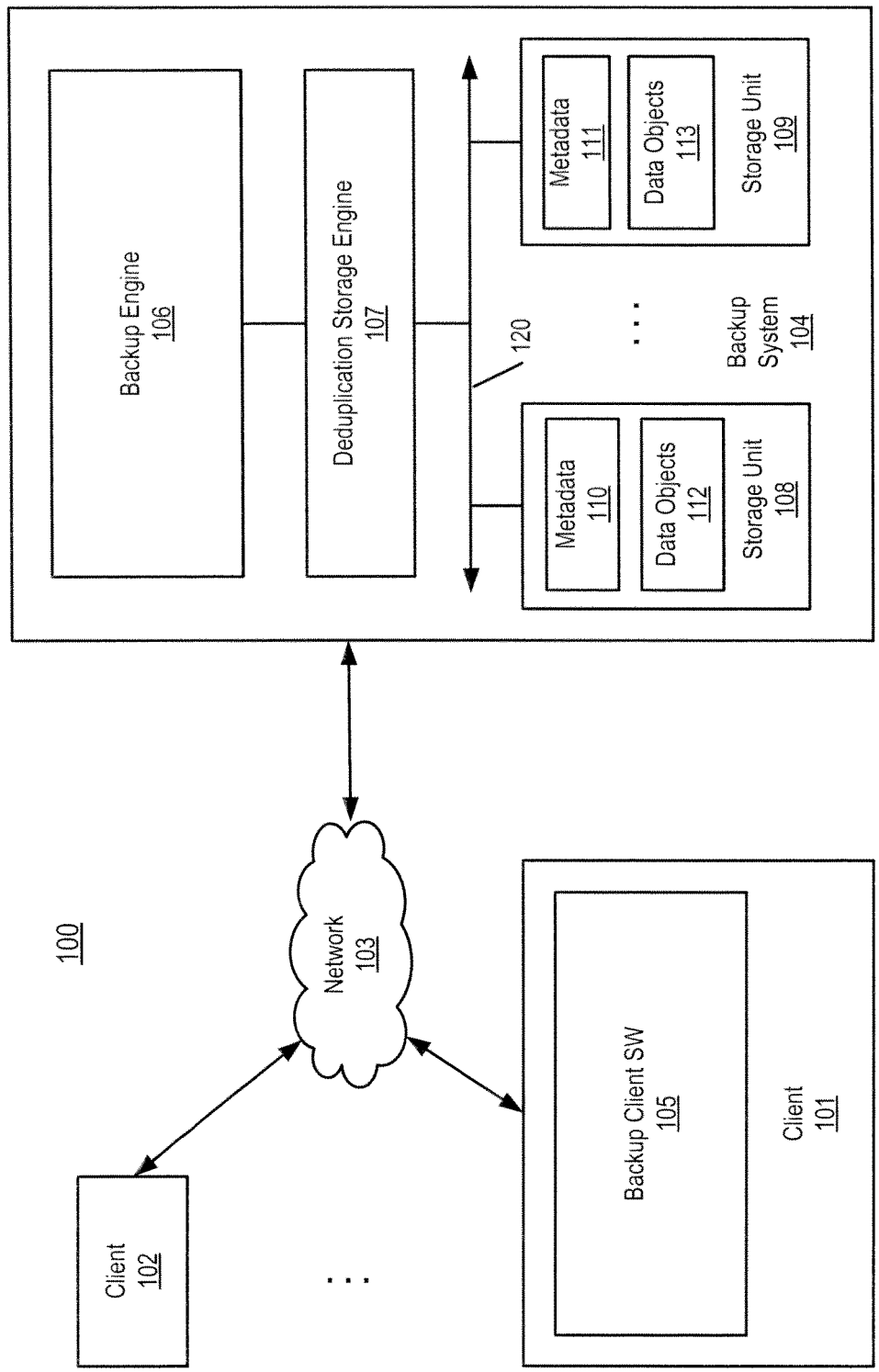
FIG. 1 is a block diagram illustrating a system for backup according to one embodiment of the invention.

FIG. 1 is a block diagram illustrating a storage system 100 according to one embodiment of the invention. Referring to FIG. 1, system 100 includes, but is not limited to, one or more client systems 101-102 communicatively coupled to backup system 104 over network 103. Clients 101-102 may be any type of client devices such as servers, personal computers (e.g., desktops, laptops, and tablets), "thin" clients, personal digital assistants (PDAs), Web enabled appliances, gaming devices, media players, and/or mobile phones (e.g., Smartphones). Network 103 may be any type of wired or wireless network such as a local area network (LAN), a wide area network (WAN) such as the Internet, or a combination thereof.

Backup system 104 may represent any type of server or cluster of servers. For example, backup system 104 may be a storage server used for any of various different purposes, such as to provide users with access to shared data and/or to back up data such as mission critical data. In one embodiment, backup system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Backup engine 106 is configured to back up data of clients 101-102 and to store the backup files in storage units 108-109.

In response to a data file, for example, received from backup engine 106, to be stored in storage units 108-109, according to one embodiment, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in storage units 108-109. In the event that deduplication storage engine 107 chooses not to store the chunk in storage units 108-109, deduplication storage engine 107 stores metadata associated with the chunk to enable the reconstruction of a file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In other embodiments, backup engine 106 may work in conjunction with deduplication storage engine 107 and backup client software 105, which is located on client 101, to process and store files, directories, and other data objects as described below in reference to FIGS. 2-13. Backup engine 106, deduplication storage engine 107, and backup client software 105 may be a combination of software and hardware components that are capable of generating and processing data streams to backup and update data.

File Backup Using a Common Backup Format

Figure 2:
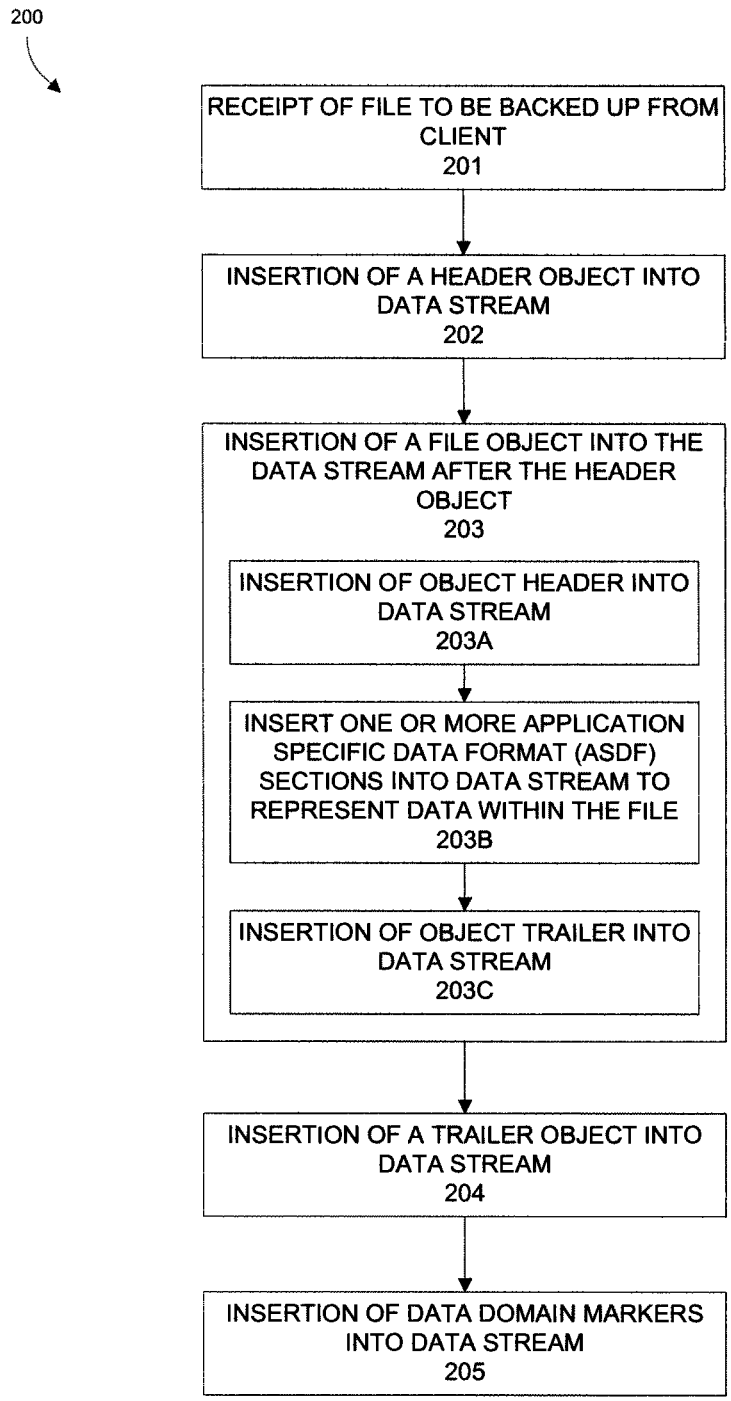
FIG. 2 shows a method for backing-up a file according to one embodiment of the invention.

FIG. 2 shows a method 200 for backing-up a file according to one embodiment of the invention. The file to be backed-up may be a computer file that stores information in a digital medium for use by one or more applications on client 101 or another computing device. For example, the file to be backed-up may be a logical unit number (LUN) image, a Virtual Machine Disk (VMDK) image, or any other similar digital container of data. In one embodiment, backing-up the file includes the encoding of the file in a common backup format as described in further detail below. Method 200 may be performed by one or more components of storage system 100. For example, method 200 may be performed by one or more of backup client software 105 on client 101 and backup engine 106 on backup system 104.

Method 200 may begin at operation 201 with the receipt of the file to be backed-up in backup system 104. In one embodiment, operation 201 is performed by retrieving a file stored in a file system of a storage unit on client 101. The retrieval may be performed by backup engine 106 over network 103 using standard networking protocols or may be performed by backup client software 105 using data retrieval commands.

Figure 3:
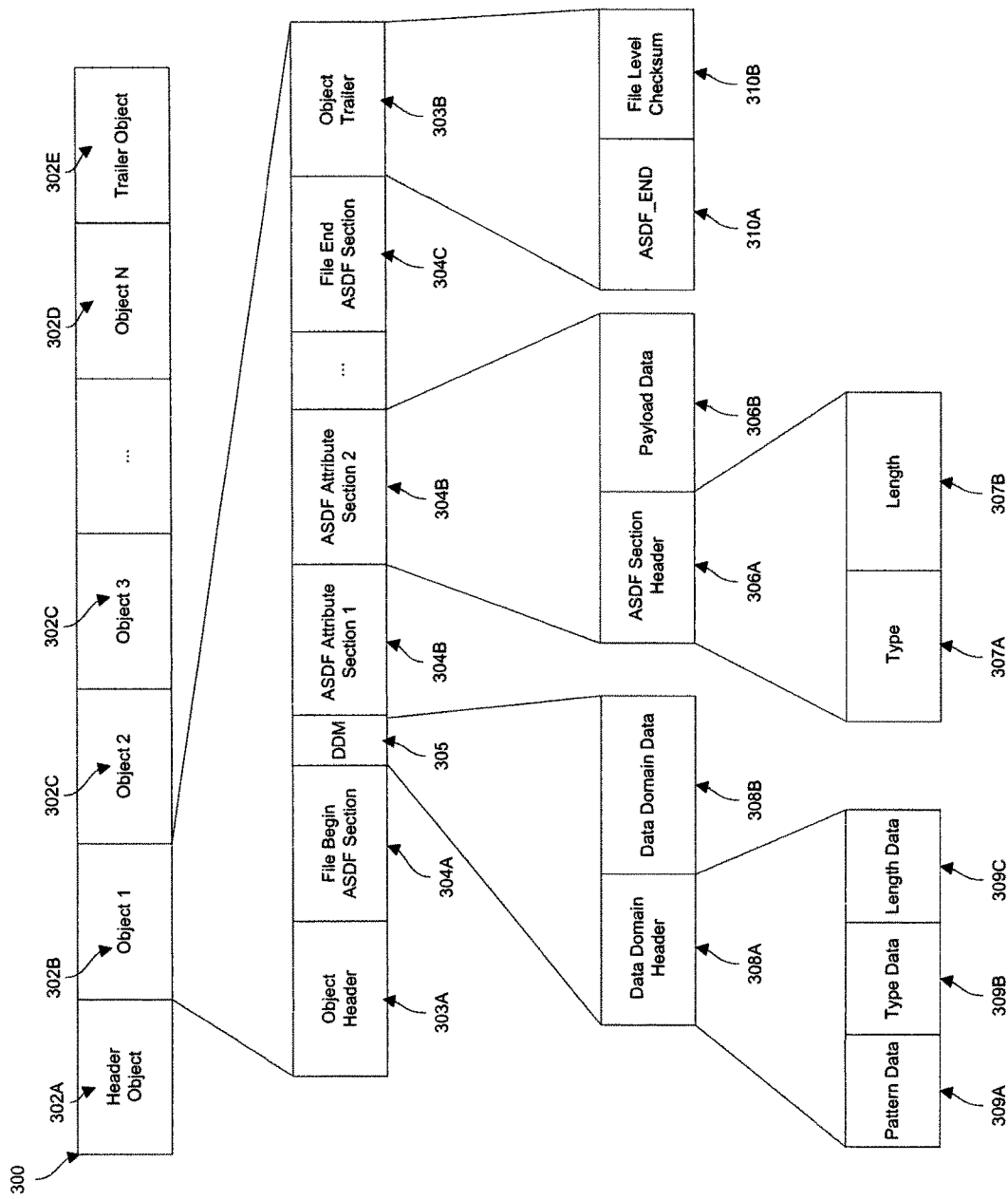
FIG. 3 shows an example of the generated data stream according to one embodiment of the invention.

After a file has been retrieved, method 200 begins to generate a data stream 300 that represents the file. Data stream 300 may thereafter be stored within storage units 108 and/or 109 such that the file is backed-up. FIG. 3 shows an example of the generated data stream 300 according to one embodiment. As shown, data stream 300 is constructed of multiple objects 302. Each of the objects 302 may represent separate files, directories, or other segments of data. Although, method 200 describes backing up files in data stream 300, data stream 300 may be used to backup directories and other segments of data into data stream 300 as will be described in further detail below in relation to FIGS. 4 and 5. Although described with respect to a single file, method 200 may be used to backup multiple files in data stream 300 using similar techniques.

In one embodiment, each object 302 in data stream 300 includes object data and metadata information. After generation, data stream 300 may be stored in one or more of storage units 108 and 109 such that the file is backed-up in backup system 104. Each object 302 may be appended to the end of data stream 300 in a continuous manner.

In one embodiment, generation of data stream 300 begins at operation 202 with the insertion of a header object 302A into data stream 300. Header object 302A includes data describing data stream 300. For example, header object 302A may include data indicating the version number of the common backup format used for data stream 300, a checksum algorithm used for data stream 300, an operating system name and version for client 101 from which the file was retrieved, a backup identifier, and a backup server identifier indicating the backup server (e.g., backup system 104 or storage unit 108 or 109) in which data stream 300 is stored.

After the insertion of header object 302A, operation 203 inserts object 302B into data stream 300 representing the file to be backed-up. Object 302B is inserted into data stream 300 after header object 302A. Object 302B may include several segments of data that represent the file and allow the file to be efficiently stored and processed by both client 101 and backup system 104. Each of the sub-operations for generating object 302B will now be discussed. Although these sub-operations are shown and described in a sequential order based on their location in data stream 300, in other embodiments the sub-operations may be performed in a different order.

Operation 203 may begin with the insertion of object header 303A at sub-operation 203A. Object header 303A may include data context information for the file represented by object 302B and/or data stream 300. In one embodiment, object header 303A may include a data value indicating if object 302B is the last object in data stream 300, a data value indicating the version/type of object 302B, a data value indicating a file level checksum type, and additional backup object metadata.

Following the insertion of object header 303A into data stream 300, operation 203B may insert one or more application specific data format (ASDF) sections 304 into data stream 300. ASDF sections 304 use type based encoding to represent the file. Each ASDF section 304 includes an ASDF section header 306A and payload data 306B. ASDF section header 306A includes a type data value 307A indicating the type of ASDF section 304 and a length data value 307B indicating the length of corresponding payload data 306B. Both type data value 306A and length data value 307B may be integer values. Payload data 306B includes data representing data within the file to be backed-up. For example, when the file to be backed-up is an image file (e.g., GIF, JPEG, etc.), payload data 306B may represent pixels that represent the image. In one embodiment, payload data 306B includes references to data stored in a location external to data stream 300. For example, the references may be to previously stored chunks of data. Referencing previously stored chunks of data reduces data duplication within backup system 104.

As noted above, multiple ASDF sections 304 may be inserted into data stream 300 to represent object 302B. In one embodiment, the first ASDF section 304A indicates the beginning of one or more ASDF attribute sections 304B while the last ASDF section 304C indicates the end of the ASDF attribute sections 304B. In this embodiment, ASDF attribute sections 304B include data representing the contents of the file, the first ASDF section 304A includes metadata for the file, and the last ASDF section 304B includes a pattern indicating the end of the multiple ASDF sections 304 for object 302B. In one embodiment, ASDF section header 306A of last ASDF section 304C is zero filled while payload data 306B of last ASDF section 304C is empty. This pattern allows ASDF section 304C to be easily identified in data stream 300.

After operation 203B, object 302B is ended by inserting object trailer 303B into data stream 300 at operation 203C. Object trailer 303B may include a pattern 310A identifying it as the last segment of data in object 302B and a file level checksum value 310B.

As described above, operation 203 generates and inserts object 302B into data stream 300 to represent the file to be backed-up. Similar operations and procedures may be performed for other files on client 101 such that corresponding additional objects 302C and 302D are inserted into data stream 300.

At operation 204, a trailer object 302E may be inserted into data stream 300 following object 302B and any additional objects 302C and 302D. Trailer object 302E includes data describing data stream 300. For example, in one embodiment, trailer object 302E may include data that validates the consistency of data stream 300 along with other types of information.

In some embodiments, operation 205 may insert data domain markers 305 into data stream 300. Data domain markers 305 are used to identify regions of data within data stream 300 for deduplication heuristics processing. For example, data domain markers 305 may assist in anchoring along natural file/directory or block boundaries and identifying a special region of data for deduplication. As shown in FIG. 3, data domain markers 305 may include a data domain header 308A and data domain data 308B. Data domain header 308A may include pattern data 309A to identify data domain markers 305 in data stream 300, a type data value 309B to indicate the type of data domain marker 305, and a length data value 309C describing the length of the data domain data 308B and any additional data following the data domain marker 305 that should be recognized by the marker 305. Data domain data 308B may include any additional data related to data domain marker processing.

Through the use of ASDF sections 304, data domain markers 305 may be easily inserted into data stream 300 such that regions of data within data stream 300 may be easily identified during deduplication and other processing. For example, in one embodiment, data domain markers may be inserted into payload section 306B of first ASDF section 304A.

Although operation 205 is shown as occurring after the insertion of objects 302 into data stream 300, operation 205 may occur at any point in method 200. For example, data domain markers 305 may be inserted after the insertion of one or more ASDF sections 304 or other elements of data into data stream 300. In this manner, data makers 305 are appended to data stream 300 as needed.

As described above, method 200 generates data stream 300 to backup a file in a file system of client 101 using a common backup format. Method 200 may be similarly applied to backup additional files in a similar fashion by inserting additional objects 302C and 302D into data stream 300. The data format for data stream 300 described above supports next generation disk based backup systems and optimizes data for deduplciation storage. Based on the data format of data stream 300, a log based virtual construction may be used, as described below, to rapidly improve efficiency of virtual full backup without costly operations of scanning complete client data sets.

Directory Backup Using a Common Backup Format

Figure 4:
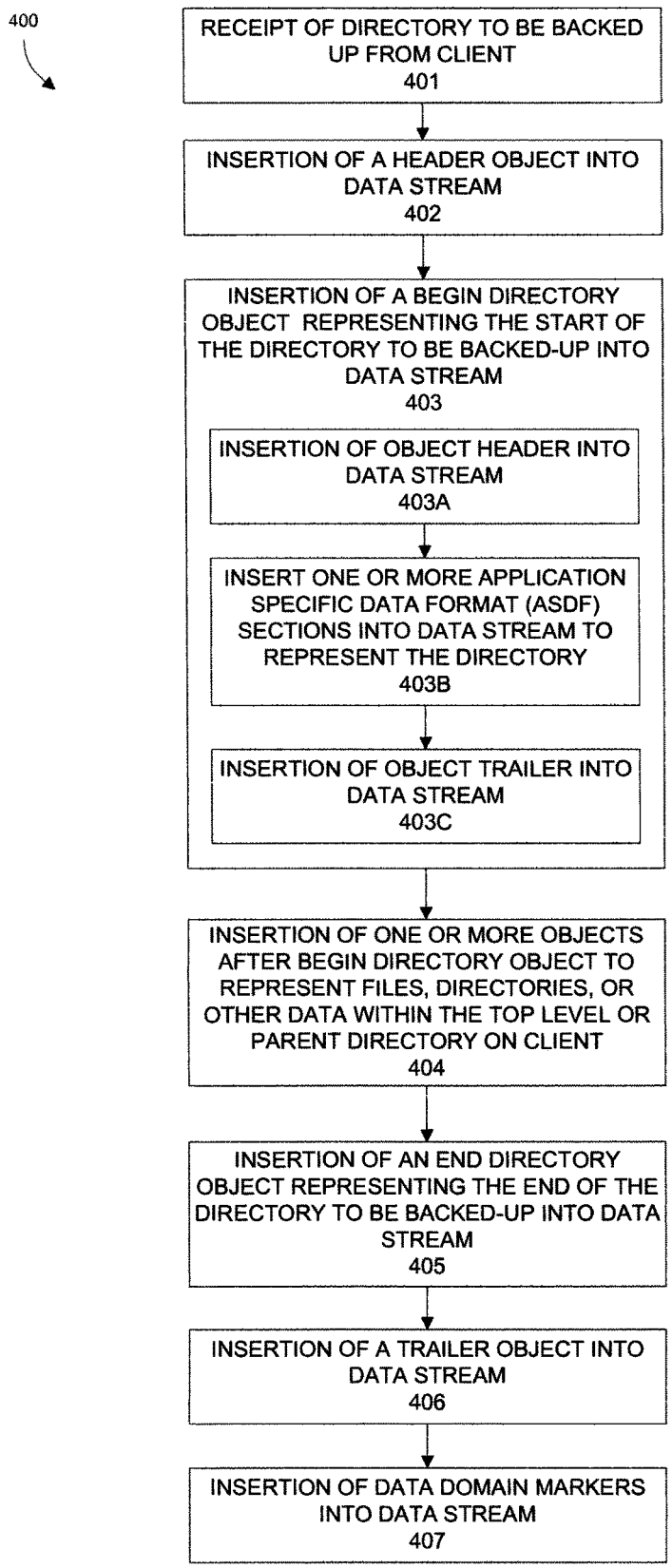
FIG. 4 shows a method for backing-up a directory and the contents of the directory according to one embodiment of the invention.

As noted above, the data format used for data stream 300 to backup files from client 101 may be similarly used to backup directory structures on client 101. FIG. 4 shows a method 400 for backing-up a directory and the contents of the directory according to one embodiment of the invention. Method 400 may be performed by one or more components of the storage system 100. For example, method 400 may be performed by one or more of backup client software 105 on client 101 and backup engine 106 on backup system 104.

Method 400 may begin at operation 401 with the receipt or data representing a directory to be backed-up in backup system 104. In one embodiment, operation 401 is performed by retrieving a directory stored in a file system of a storage unit on client 101. The retrieval may be performed by backup engine 106 over network 103 using standard networking protocols or may be performed by backup client software 105 using data retrieval commands.

Figure 5A:
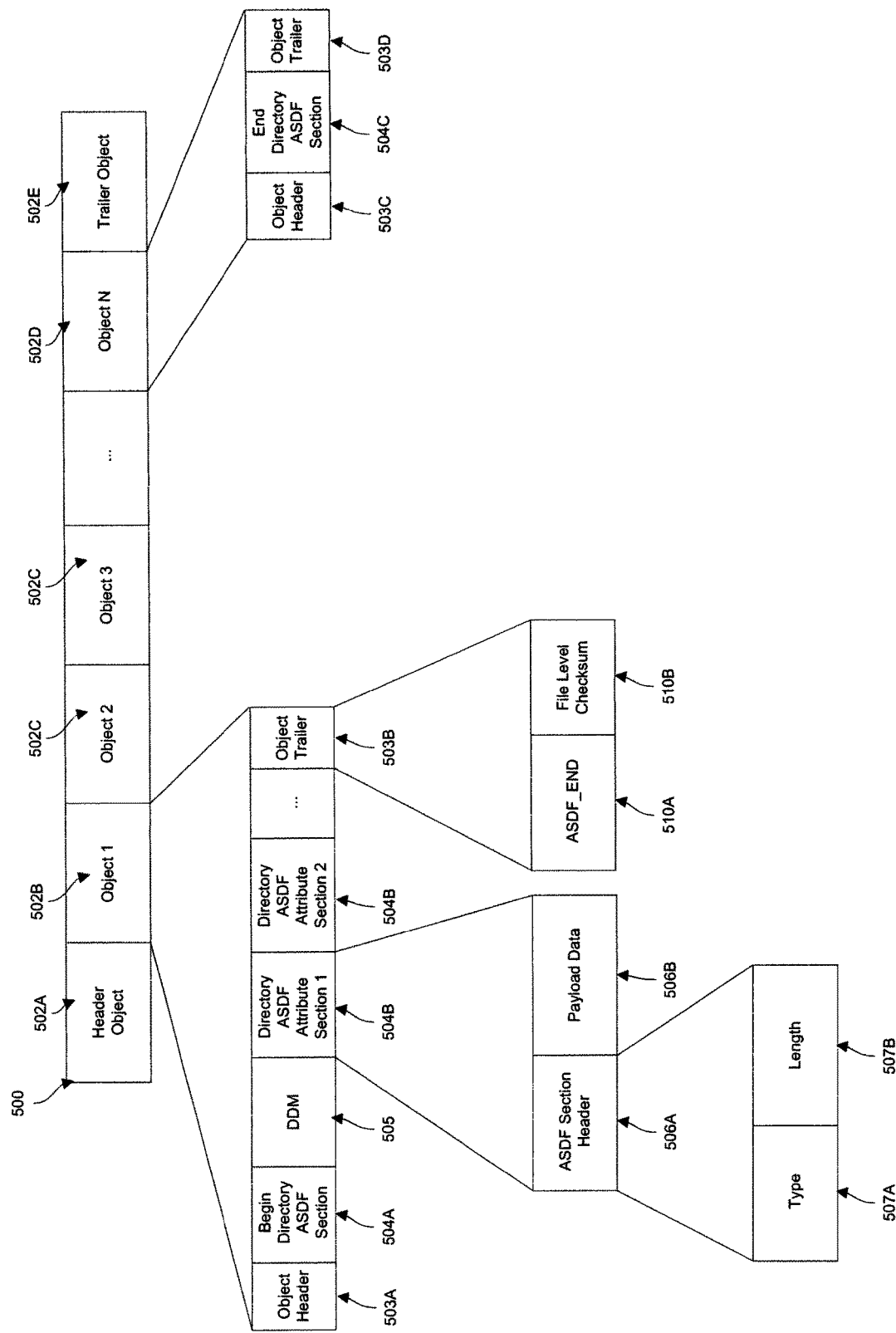
FIGS. 5A-5C shows an example of the generated data stream 500 according to one embodiment of the invention.

After a directory has been retrieved, method 400 begins to generate a data stream 500 that represents the directory. FIG. 5A shows an example of the generated data stream 500 according to one embodiment. As shown, data stream 500 is constructed of multiple objects 502 in a similar fashion as data stream 300 shown in FIG. 3. Each of objects 502 may represent separate files, directories, or other segments of data.

In one embodiment, each object 502 includes object data and metadata information. After generation, data stream 500 may be stored in one or more of storage units 108 and 109 such that the directory is backed-up in backup system 104.

In one embodiment, generation of data stream 500 begins at operation 402 with the insertion header object 502A into data stream 500. Header object 502A includes data describing data stream 500. For example, header object 502A may include data indicating the version number of the data format used for data stream 500, a checksum algorithm used for data stream 500, an operating system name and version for client 101 from which the directory was retrieved, a backup identifier, and a backup server identifier indicating the backup server (e.g., backup system 104 or storage unit 108 or 109) in which data stream 500 is stored. In one embodiment, header object 502A of data stream 500 is similar or identical in format to header object 302A for data stream 300 shown in FIG. 3.

After the insertion of header object 502A operation 403 inserts a begin directory object 502B into data stream 500 representing the start of the directory to be backed-up in data stream 500. Object 502B may include several segments of data that describe the directory and allow the directory to be efficiently stored and processed by both client 101 and backup system 104. Each of the sub-operations for generating object 502B will now be discussed. Although these sub-operations are shown and described in a sequential order based on their location in data stream 500, in other embodiments the sub-operations may be performed in a different order. In one embodiment, begin directory object 502B is similar or identical in format to object 302B shown in FIG. 3.

Operation 403 may begin with the insertion of object header 503A at sub-operation 403A. Object header 503A may include data context information for the directory to be backed up. In one embodiment, object header 503A may include a data value indicating if object 502B is the last object in data stream 500, a data value indicating the version/type of object 502B, a data value indicating a checksum type, and additional backup object metadata. In one embodiment, object header 503A is similar or identical in format to object header 303A shown in FIG. 3.

Following the insertion of object header 503A into data stream 500, operation 403B may insert one or more application specific data format (ASDF) sections 504 into data stream 500. ASDF sections 504 use type based encoding to represent the directory. In one embodiment, ASDF sections 504 are similar or identical in format to ASDF sections 304 shown in FIG. 3. Each ASDF section 504 includes an ASDF section header 506A and payload data 506B. ASDF section header 506A includes a type data value 507A indicating the type of ASDF section 504 and a length data value 507B indicating the length of corresponding payload data 506B. Both type data value 506A and length data value 507B may be integer values.

In one embodiment, begin directory ASDF sections 504A is the first ASDF section 504 in object 502B. Begin directory ASDF section 504A denotes the beginning of one or more ASDF attribute sections 504B. ASDF attribute sections 504B may include metadata describing the directory. For example, ASDF attribute sections 504B may include metadata describing the name of the directory, the created date of the directory, the last modified date of the directory, etc.

After operation 403B, object 502B is completed by inserting object trailer 503B into data stream 500 at operation 403C. Object trailer 503B may include pattern 510A identifying it as the last segment of data in object 502B and a directory level checksum value 510B. In one embodiment, object trailer 503B is similar or identical in format to object trailer 303B shown in FIG. 3.

Figure 5B:
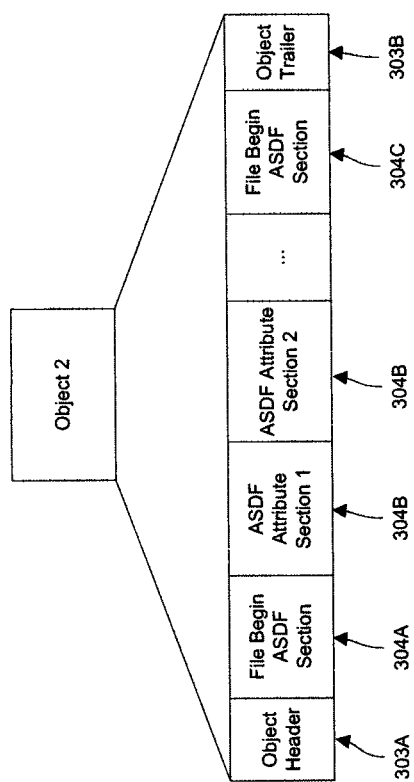
Figure 5C:
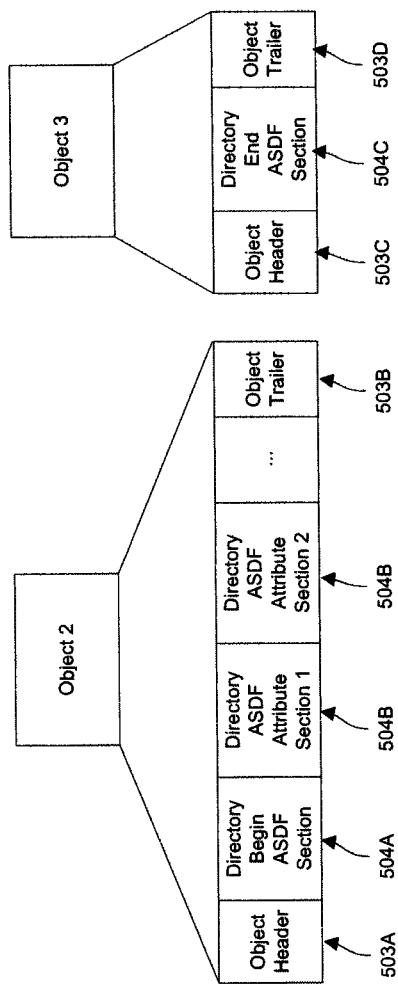

At operation 404, one or more objects 502C may be inserted into data stream 500 after object 502B to represent files, directories, or other data that is within the top level or parent directory on client 101. In one embodiment, objects 502C may be placed into data stream 500 using one or more of the operations and structure shown in FIGS. 2 and 3. For example, operation 203 may be used to insert one or more objects 502C that represent files within the directory to be backed-up into data stream 500. In another embodiment, an object 502C may be placed into data stream 500 using one or more of the operations 403 and 404 such that two inserted objects 502C represent a sub-directory within the directory to be backed-up as shown in FIG. 5C. Additional objects 502 may be recursively inserted throughout data stream 500 to represent files, directories, and other data within each directory.

At operation 405, an end directory object 502D may be inserted into data stream 500. End directory object 502D denotes the end of data representing the directory to be backed-up on client 101 within data stream 500. Accordingly, as described above, one or more objects 502C may be placed between begin directory object 502B and end directory object 502D. In these embodiments, objects 502C may represent file objects as shown in FIG. 5B and/or directory objects (i.e., a begin directory object 502B and an end directory object 502D for each sub-directory) as shown in FIG. 5C.

In one embodiment, end directory object 502D includes an object header 503C similar to object header 503A used for the begin directory object 502B, directory end ASDF section 504C that denotes object 502D as the end of data corresponding to the directory to be backed-up, and an object trailer 503D similar to object trailer 503B used for the begin directory object 502B.

At operation 406, a trailer object 502E may be inserted into data stream 500 following objects 502B-502D. Trailer object 502E includes data describing data stream 500. For example, in one embodiment, trailer object 502E may include data that validates the consistency of data stream 500 along with other types of information.

In some embodiments, operation 407 may insert data domain markers 505 into data stream 500. Data domain markers 505 are used to identify regions of data within data stream 500 for deduplication heuristics processing. For example, data domain markers 505 may assist in anchoring along natural file/directory or block boundaries and identifying a special region of data for deduplication. As shown in FIG. 3, data domain markers 505 may include a data domain header 508A and data domain data 508B. Data domain header 508A may include pattern data 509A to identify data domain markers 505 in data stream 500, a type data value 509B to indicate the type of data domain marker 505, and a length data value 509C describing the length of the data domain data 508B and any additional data following the data domain marker 505 that should be recognized by the marker 505. Data domain data 508B may include any additional data related to data domain marker processing.

As described above, the begin directory object 502B and the end directory object 502D are similar in structure to the file objects 302B described above in relation to FIGS. 2 and 3. For example, both the begin directory object 502B and the end directory object 502D include object headers 503A/503C, ASDF sections 504, and object trailers 503B/503D.

Through the use of ASDF sections 504, data domain markers 505 may be easily inserted into data stream 500 such that regions of data within data stream 500 may be easily identified during deduplication and other processing. For example, in one embodiment, data domain markers 505 may be inserted into payload section 506B of begin directory ASDF section 504A.

Although operation 407 is shown as occurring after the insertion of objects 502 into data stream 500, operation 407 may occur at any point in method 400. For example, data domain markers 505 may be inserted after the insertion of one or more ASDF sections 504 or other elements of data into data stream 500. In this manner, data makers 305 are appended to data stream 300 as needed.

As described above, method 400 generates data stream 500 by continually appending objects 502 to data stream 500 such that a directory and elements within the directory are backed-up using a common backup format. Method 400 may be similarly applied to backup additional directories in a similar fashion by inserting additional objects 502 into data stream 500. The data format for data stream 500 described above supports next generation disk based backup systems and optimizes data for deduplication storage. Based on the data format of data stream 500, a log based virtual construction may be used, as described below, to rapidly improve efficiency of virtual full backup without costly operations of scanning complete client data sets.

Checksum Stream for a Data Stream

Figure 6:
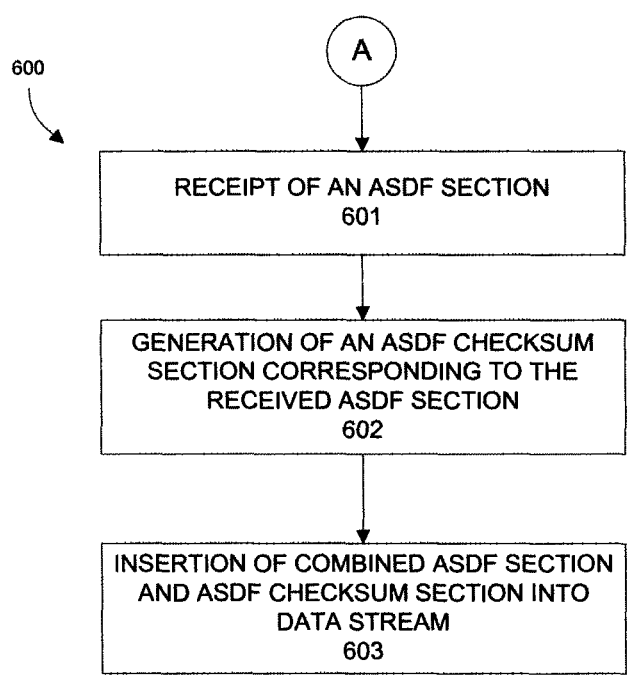
FIG. 6 shows a method for inserting ASDF checksum sections into a data stream according to one embodiment of the invention.
Figure 7:
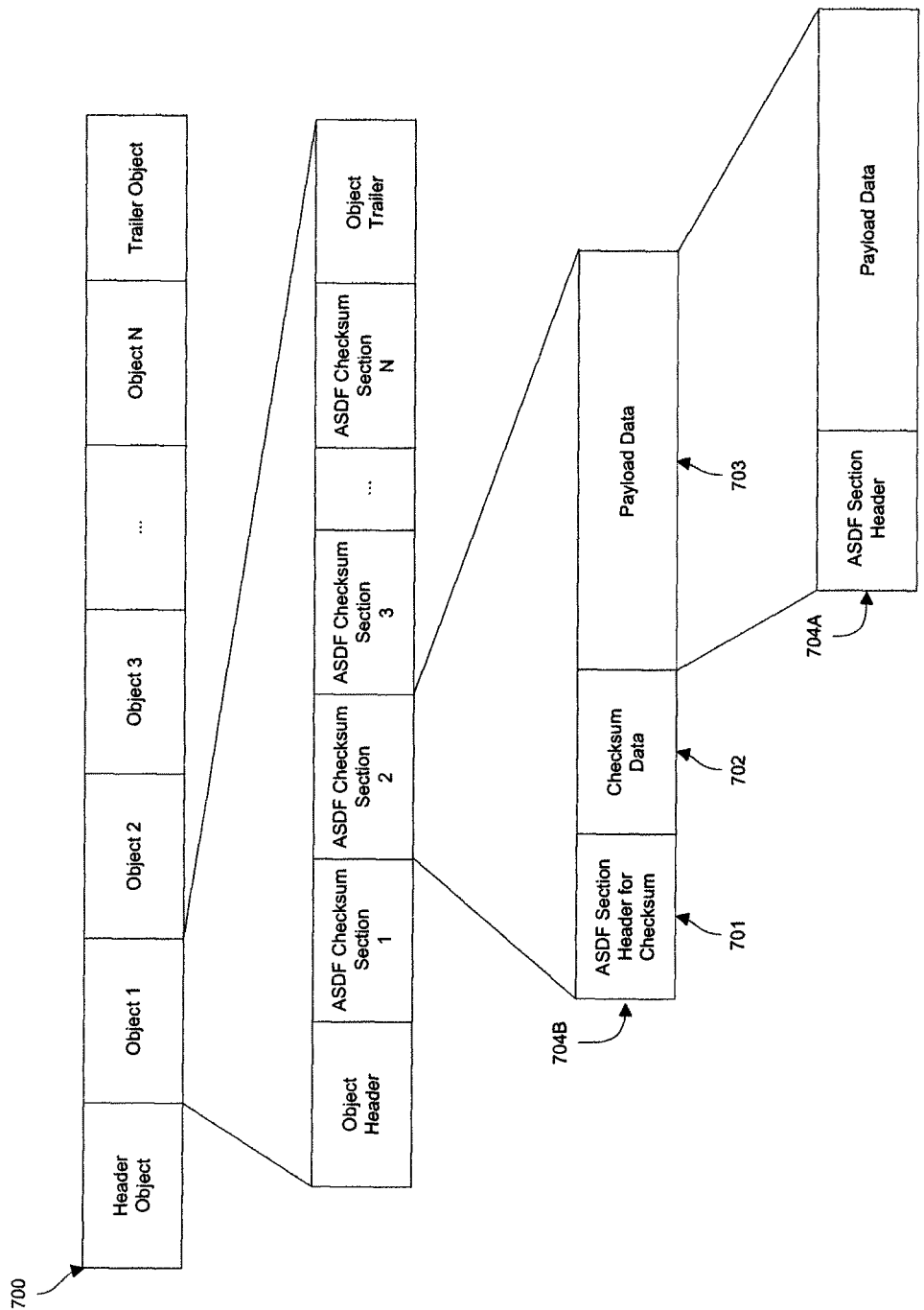
FIG. 7 shows an example of inserting checksums within a data stream according to one embodiment of the invention.

In one embodiment, a data stream 700 as shown in FIG. 7 may be modified to include ASDF checksum sections 704B, which represent checksum values for data in other ASDF sections 704A. FIG. 6 shows a method 600 for inserting ASDF checksum sections 704B into data stream 700 for ASDF section 704A. In one embodiment, data stream 700 and ASDF sections 704A may be similar or identical in format to data streams 300 and 500 and ASDF sections 304 and 504, respectively. Method 600 may be performed by one or more components of storage system 100. For example, method 600 may be performed by one or more of backup client software 105 on client 101 and backup engine 106 on backup system 104.

Method 600 may begin at operation 601 with the receipt of an ASDF section 704A. In one embodiment, operation 601 is performed after the ASDF section 704A is generated to represent data in a file or directory as discussed above in relation to FIGS. 2-5.

After retrieval of ASDF section 704A, operation 602 generates an ASDF checksum section 704B. ASDF checksum section 704B may include an ASDF section header for checksum 701, a checksum data value 702, and payload data 703. Checksum data value 702 represents a checksum for the retrieved ASDF section 704A. In one embodiment, ASDF section 704A may be placed within payload data 704 such that ASDF checksum section 704B is a wrapper for ASDF section 704A. In one embodiment, checksum data value 702 is generated in part based on ASDF section header for checksum 701.

After ASDF checksum section 704B has been generated, operation 603 inserts the ASDF section 704A and ASDF checksum section 704B into data stream 700. As noted above, in one embodiment ASDF section 704A may be placed within payload data 704 such that ASDF checksum section 704B is a wrapper for ASDF section 704A. In this embodiment, operation 603 may be performed by placing the combined ASDF section 704A and ASDF checksum section 704B into data stream 700. By generating and inserting checksum values into data stream 700 as described above, method 600 provides a streamlined and unified approach to generation of data stream 700.

Figure 8:
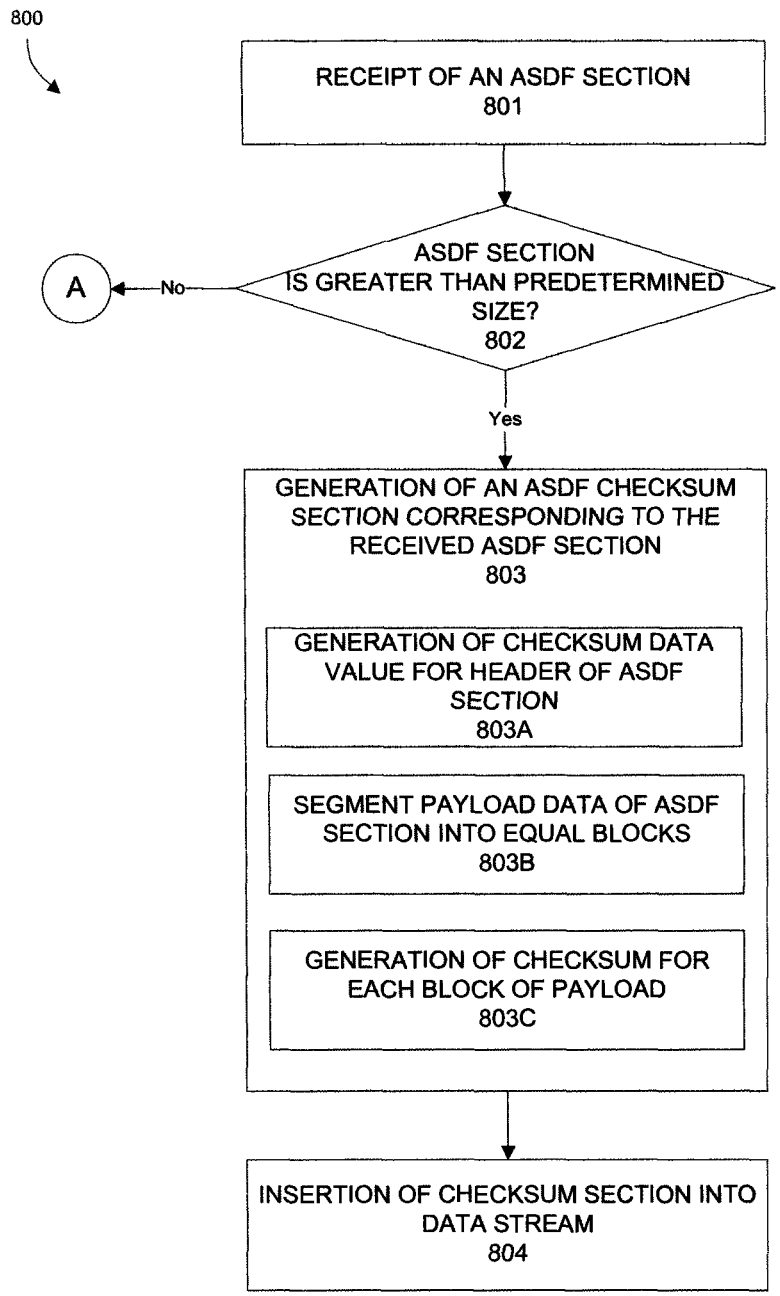
FIG. 8 shows a method for inserting ASDF checksum sections into a data stream according to one embodiment of the invention.

In one embodiment, ASDF checksum section 704B may be inserted inline with ASDF section 704A in data stream 700 instead of acting as a wrapper for ASDF section 704A. For example, FIG. 8 shows a method 800 for inserting ASDF checksum section 704B inline with ASDF section 704A when the size of ASDF section 704A is greater than a predetermined value. Method 800 may be performed by one or more components of storage system 100. For example, method 800 may be performed by one or more of backup client software 105 on client 101 and backup engine 106 on backup system 104.

Method 800 may begin at operation 801 with the receipt of an ASDF section 704A. In one embodiment, operation 801 is performed after the ASDF section 704A is generated to represent data in a file or directory as discussed above in relation to FIGS. 2-5.

After ASDF section 704A is retrieved, operation 802 compares the size of ASDF section 704A with a predetermined value. When the size of ASDF section 704A is less than the predefined value, method 800 moves to block A. Block A causes checksum values to be generated and inserted in data stream 700 according to method 600 outlined above and in FIGS. 6 and 7.

When the size of ASDF section 704A is greater than the predefined value, method 800 moves to operation 803 to generate ASDF checksum section 704B. ASDF checksum section 704B may include an ASDF section header for checksum 701, a checksum data value 702, and payload data 703. Operation 803 may include several sub-operations to generate ASDF checksum section 704B. Although described in a particular order, in other embodiments the sequence of the sub-operations for operation 803 may be altered.

At operation 803A checksum data value 702 may be generated based on ASDF section header 306A. In contrast to method 600 in which checksum data value 702 represents a checksum for payload data 306B, in method 800 checksum data value 702 is a checksum value for ASDF section header 306A alone. In one embodiment, checksum data value 702 is generated in part based on ASDF section header for checksum 701.

Figure 9A:
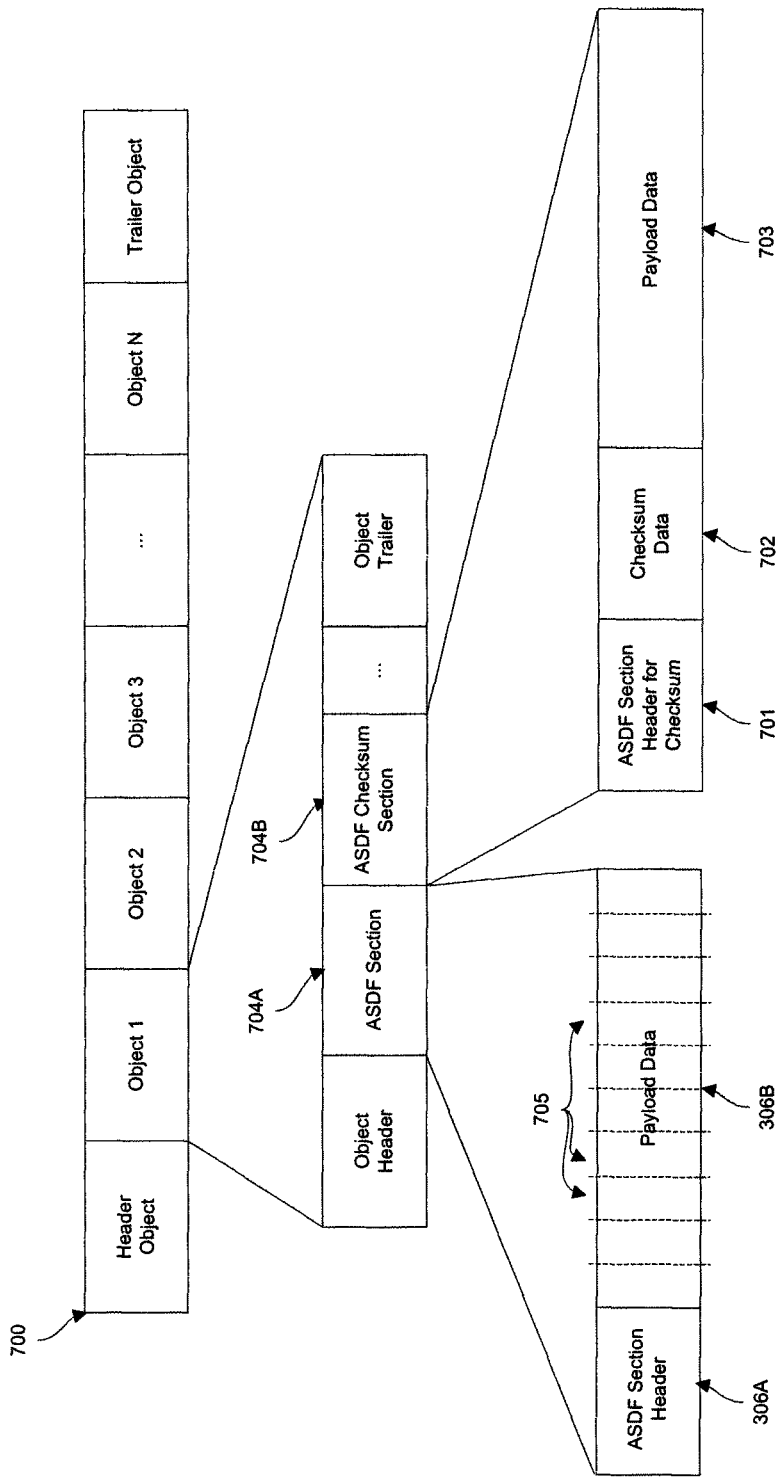
FIGS. 9A and 9B show examples for inserting checksums into a data stream according to one embodiment of the invention.

At operation 803B, payload data 306B of ASDF section 704 is segmented into equal blocks 705 as shown in FIG. 9A. In one embodiment, the segmentation may be performed relative to a prescribed block size while in other embodiments segmentation may be performed to achieve a prescribed number of blocks 705. For example, in one embodiment each block is sized to be one megabyte while in another embodiment operation 803B seeks to segment payload data 306B into ten equal sized blocks.

Figure 9B:
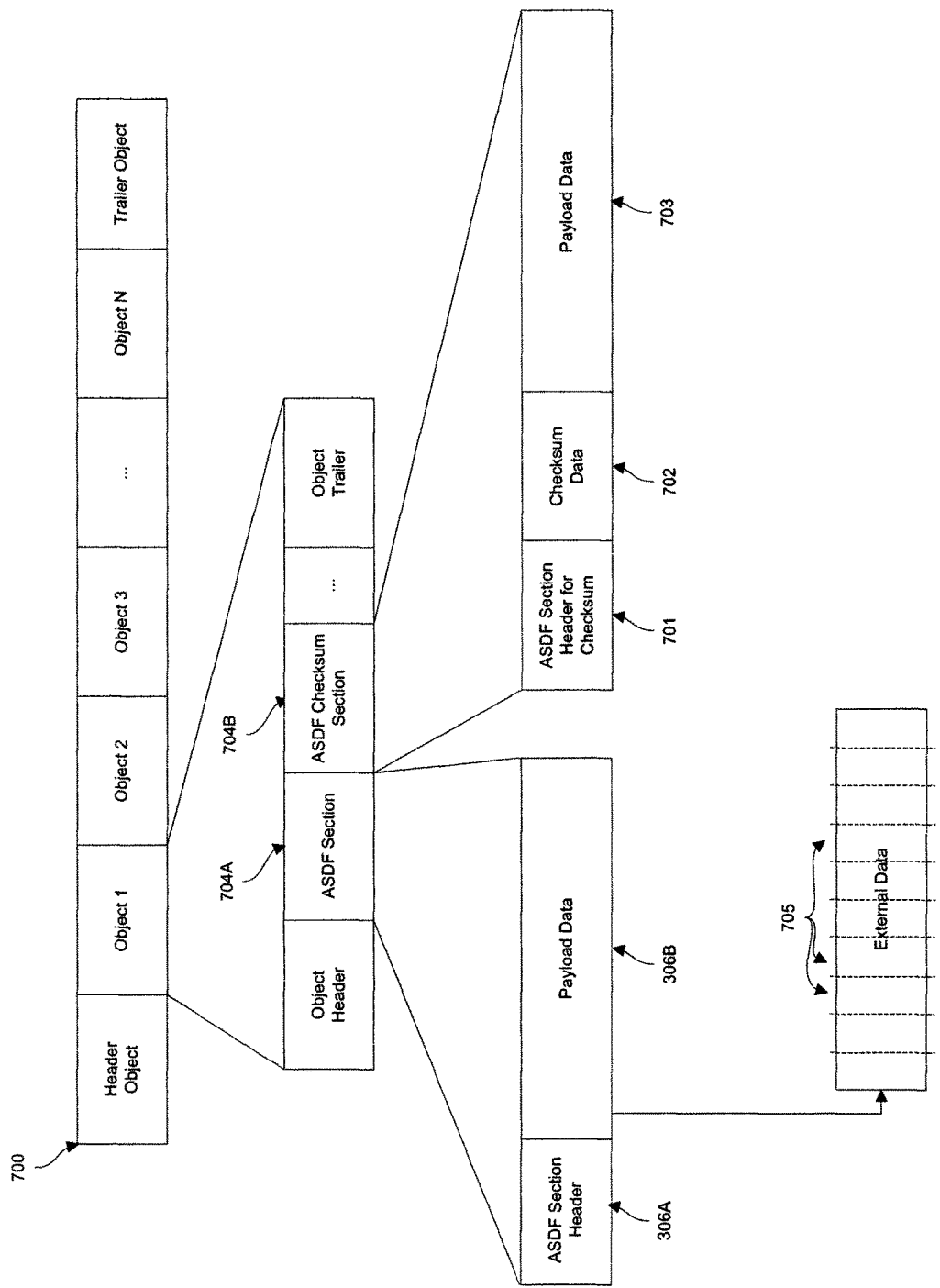

In some embodiments, payload data 306B includes references to data stored in a location external to data stream 700. For example, the references may be to previously stored chunks of data. In these embodiments, the referenced data is retrieved and segmented as shown in FIG. 9B.

At operation 803C, a checksum value is generated for each block 705 generated at operation 803B. For example, when ten blocks 705 are generated, ten checksum values are also generated, wherein each checksum value corresponds to a single block 705. The checksum values are stored in payload data 703 to form a stream of checksum values. Based on the above sub-operations, ASDF checksum section 704B is generated for ASDF section 704A.

At operation 804, ASDF checksum section 704B is inserted into data stream 700. In one embodiment, ASDF checksum section 704B is inserted after ASDF section 704A such that ASDF checksum section 704B is inline with ASDF section 704A in data stream 700. By generating and inserting checksum values into data stream 700 as described above, method 800 provides a streamlined and unified approach to generation of checksums for data stream 700, which takes into account varied sized data sections.

A Size Tree for Elements in a File System

Figure 10:
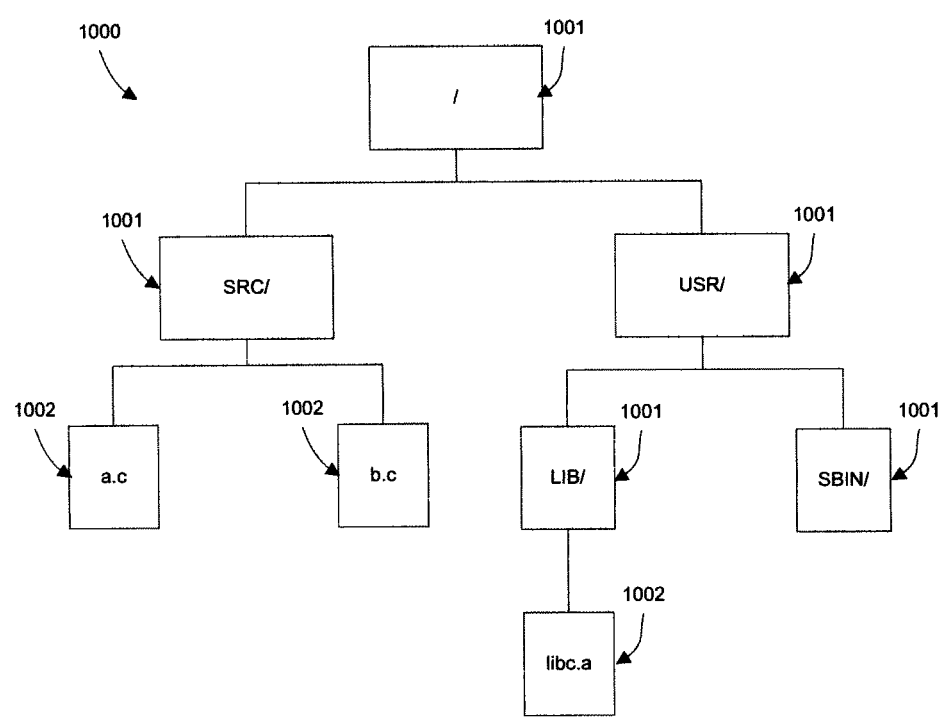
FIG. 10 shows a file system tree corresponding to a file system located in storage on a client according to one embodiment of the invention.

A snapshot of a file system residing on client 101 may be taken at a point in time. For example, FIG. 10 shows a file system tree 1000 corresponding to a file system located in storage on client 101 according to one embodiment. In this example structure, five directories 1001 are located within file system tree 1000 along with three files 1002. A consistent backup of file system on client 101 may be generated based on this snapshot using the techniques and formats described above. File system on client 101 may continue to change based on user and application activities between the last snapshot time and the time when a new snapshot is taken. The changes can be generalized into following three categories:

(1) Modification of existing backup objects (e.g., objects 302 and/or 502), including data and metadata changes;
(2) Creation of new backup objects; and
(3) Deletion of existing backup objects As discussed above and shown in FIGS. 2-9, discrete backup objects (e.g., objects 302 and/or 502) may be laid out sequentially in data stream backup (e.g., data streams 300 and/or 500) according to file system tree depth first walking order and the relative positions of backup objects within a backup stream dictated by file system hierarchy structure. As a file system undergoes change in files and directories, some portions of backup stream data may contract, expand, or shift as files and directories are being created, deleted, and modified. As only the changes represent new information and provide new values, the focus of backup may be on how to most efficiently capture those changes, while being able to combine those changes with unchanged data to present a consistent view of a full backup.

In the following discussion, change logs have been made available through client application intelligence. For example, a file system on client 101 can furnish such change logs by using I/O filters, VMware provides VMDK level change block tracking information, and storage arrays can also provide logical or block level change information.

Despite the sequential layout of backup streams discussed above, the life cycle and access pattern of backup objects may not be sequential. For example, changes, including deletions, can happen to any backup objects within. Small changes in the beginning of a data stream may cause major shifts for the rest of contents of the data stream. These potential changes make static sequential offset based referencing for backup objects highly inefficient, as large percentages of offset values need recalculation due to small changes in the data stream. These changes may result even if typical changes between backups are relatively small. To solve this problem, a size tree may be used to dynamically calculate backup object offset information while only object sizes are being maintained by the size tree to overcome the content shift effect of data stream backups.

Figure 11:
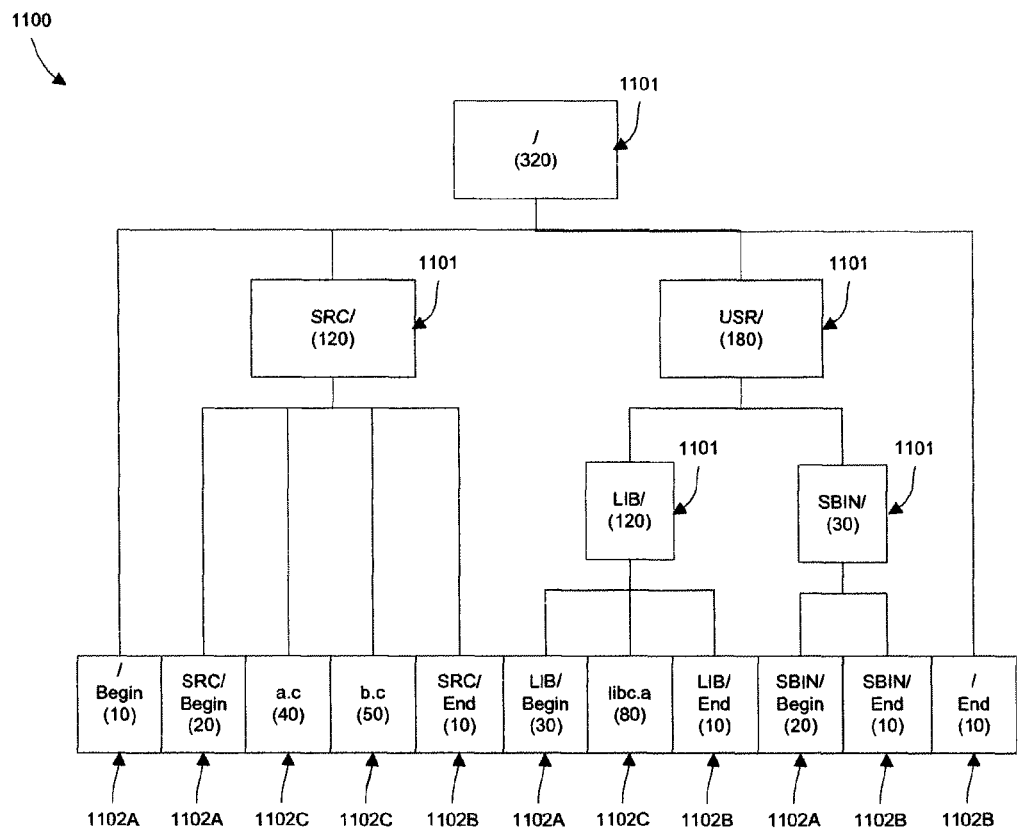
FIG. 11 shows a size tree for a file system tree according to one embodiment of the invention.

FIG. 11 shows a size tree 1100 for file system tree 1000 according to one embodiment. In size tree 1100, every non-leaf node is a cover size node 1101 that represents the sum of all object sizes for a sub-tree rooted with node 1101. Every leaf node is an object size node 1102 that represents the size of an object from a data stream backup. For example, the size of each cover size node 1101 and object size node 1102 in FIG. 11 is displayed in parentheses. Every object size node 1102 may contain a tag with an object name and may also contain other object attribute information for identification. Every cover size node 1101 is tagged with a directory name and a range of object names that it covers for the directory list the cover size node 1101 represents. Cover size nodes 1101 are used to partition large directory lists into smaller portions for faster access. For every cover size node 1101, the first child node is a leaf object size node 1101A representing a begin directory object 502B and the last child node is a leaf object size node 1101B representing an end directory object 502D. Any other nodes that are the children of the cover size node 1101 are sorted according to the range of object names they cover.

Size tree 1100 is a reflection of file system tree 1000. Thus, size tree 1100 traversal order may be used to construct a logical view of the file system that file system tree 1000 represents.

Figure 12:
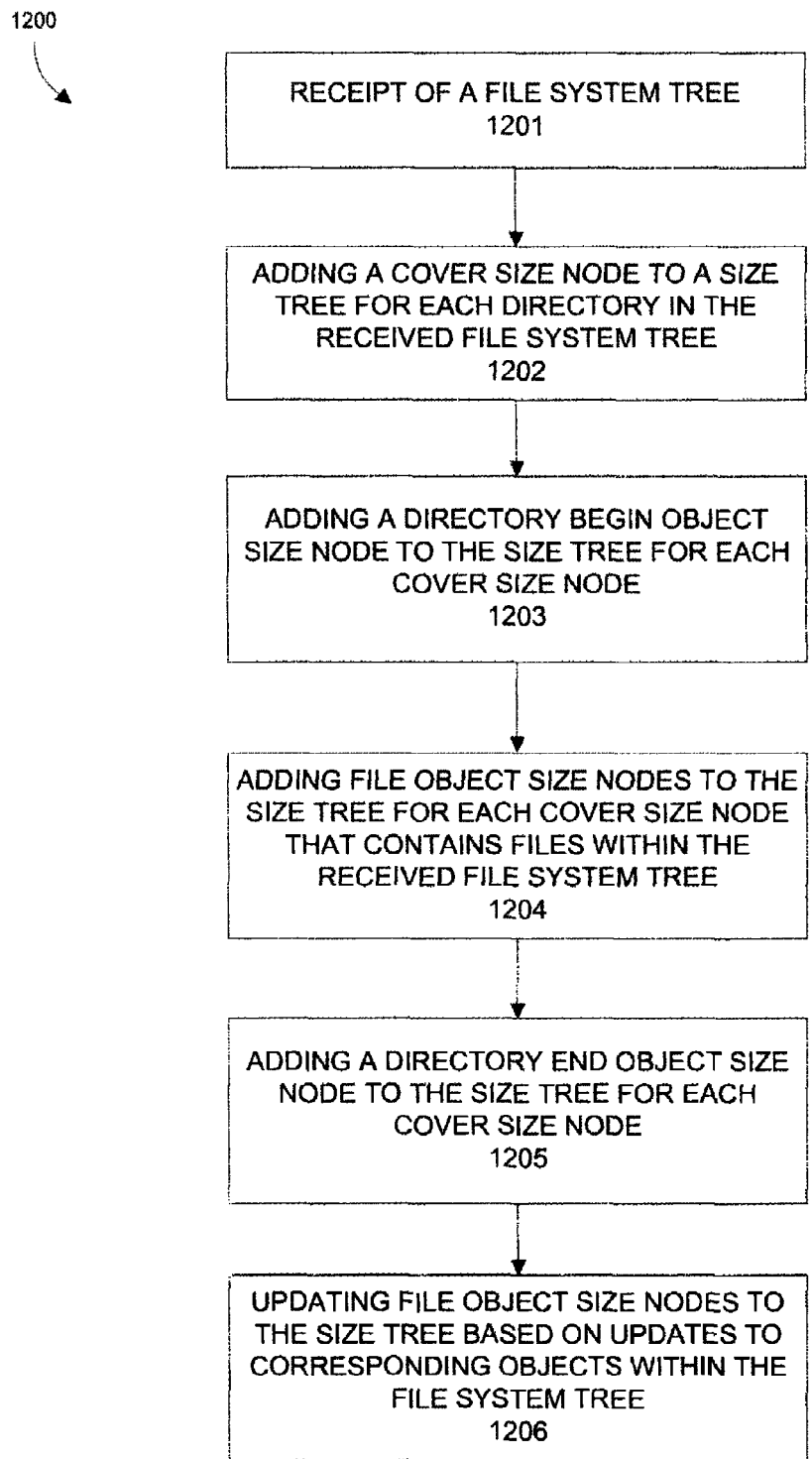
FIG. 12 shows a method for constructing a size tree according to one embodiment of the invention.

FIG. 12 shows a method 1200 for constructing a size tree according to one embodiment. Method 1200 may be performed by one or more components of storage system 100. For example, method 1200 may be performed by one or more of backup client software 105 on client 101 and backup engine 106 on backup system 104.

Method 1200 may begin at operation 1201 with receipt of a file system tree structure. In one embodiment, the received file system tree structure may be a listing of nodes and their hierarchical relationship to each other. For example, data representing file system tree 1000 may be received at operation 1201 such that a size tree may be constructed as will be described in further detail below.

Following receipt of a file system tree, operation 1202 adds a cover size node 1101 to size tree 1100 for each directory in the received file system. As noted above, cover size nodes 1101 represent the sum of all object sizes for a sub-tree rooted within respective cover size nodes 1101. As shown in FIG. 11, five cover size nodes 1101 are added to size tree 1100 representing directories "/", "src/", "lib/", and "sbin/" within file system tree 1000. As also noted above, every cover size node 1101 may be tagged with a directory name and a range of object names that it covers (e.g., children nodes).

Following addition of cover size nodes 1101 to size tree 1100, operation 1203 adds directory begin object size nodes 1102A to size tree 1100 for each cover size node 1101. In this embodiment, the first child node for each cover size node 1101 is a corresponding directory begin object size node 1102A. At operation 1204, file object size nodes 1102C are added to size tree 1100 for each cover size node 1101 that contains files within the received file system tree. These file object size nodes 1102C are sorted after a corresponding directory begin object size node 1102A, which was added at operation 1203. For example, in size tree 1100 shown in FIG. 11, a file object size node 1102C corresponding to file "libc.a" was added after directory begin object size node 1102A for a cover size node 1101 corresponding to directory "lib/".

At operation 1205, operation 1203 adds directory end object size nodes 1102B to size tree 1100 for each cover size node 1101. In this embodiment, the last child node for each cover size node 1101 is a corresponding directory end object size node 1102B. Nodes which fall between these directory begin and directory end object size nodes 1102A and 1102B represent children in the file system tree for corresponding directories.

Although described as inserting nodes in singular operations based on their respective hierarchy or class, in one embodiment each node may be appended to a data stream representing size tree 1100 as their position in the data stream is reached.

As described above, a size tree 1100 has been constructed and represents the size of elements within a received file system tree. In the size tree 1100 discussed above, the size tree 1100 may be represented by various data structures and data elements, including linked lists and flat data streams. In one embodiment, at operation 1206 file object size nodes 1102C may be updated as they are altered or removed from the corresponding file system tree. For example, a size attribute of a file object size node 1102C may be updated to reflect a change in size for a corresponding file element within a file system tree. These changes to one or more file object size nodes 1102C are carried over and reflected by corresponding changes to ancestor cover size nodes 1101 in size tree 1100.

Figure 13:
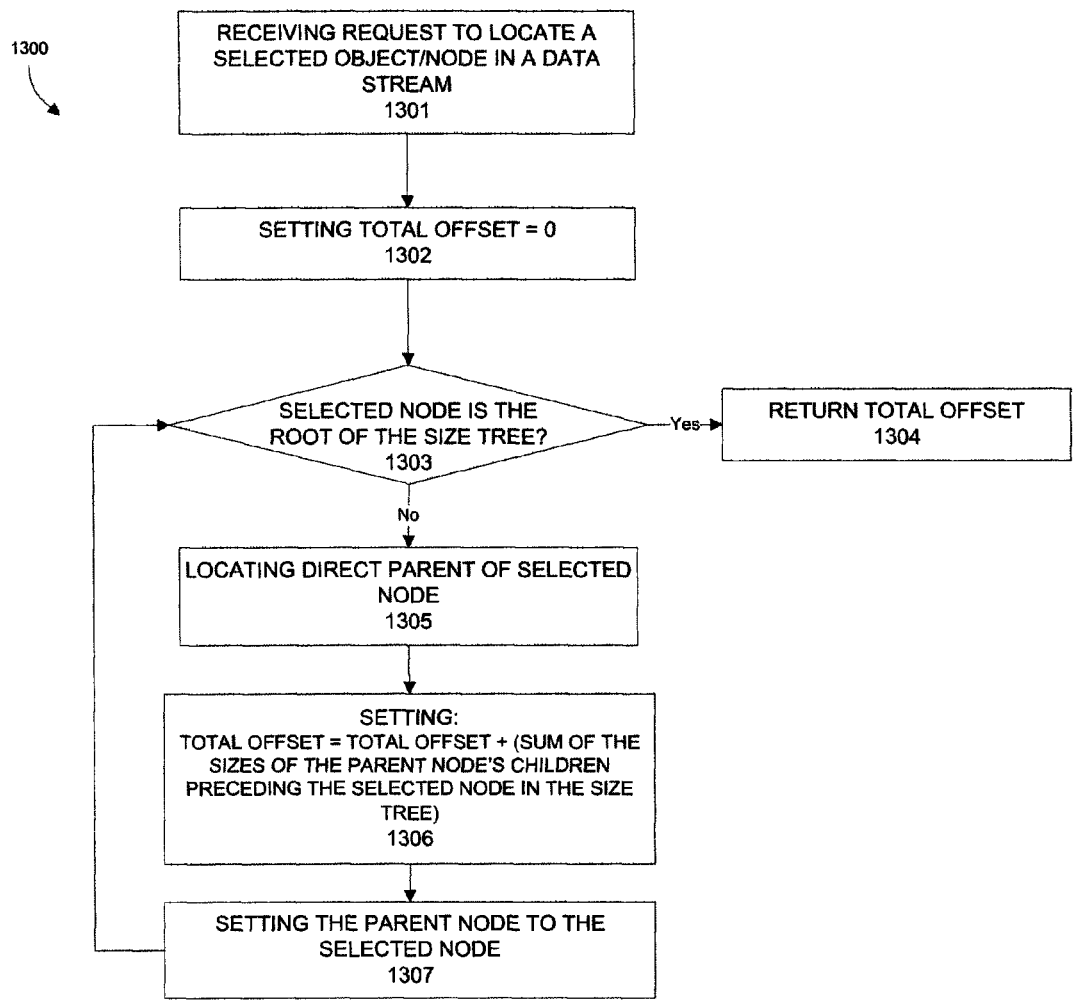
FIG. 13 shows a method for determining the offset location of objects within a data stream using a size tree according to one embodiment of the invention.

Determining a Offset Location for a Selected Element in a Data Stream by Using a Size Tree The size tree 1100 described above in relation to FIGS. 11 and 12 may be used to determine the location of objects within a data stream representing a file system as will be described below. For example, file system tree 1000 may be represented by data streams 300 and/or 500 as discussed above in relation to FIGS. 2-5. Additionally, size tree 1100 representing the sizes of objects within the data streams may be generated as discussed above in relation to FIGS. 10-12. FIG. 13 shows a method 1300 for determining the offset location of objects within the data stream 300 and/or 500 generated using the methods of FIGS. 2-5 using the size tree 1100 generated using the methods of FIGS. 10-12. In the following description, method 1300 will be described in relation to data stream 500 and size tree 1100. However, in other embodiments other data streams (e.g., data stream 300) and size trees may be used in place of data stream 500 and size tree 1100, respectively.

Method 1300 may be performed by one or more components of storage system 100. For example, method 1300 may be performed by one or more of backup client software 105 on client 101 and backup engine 106 on backup system 104.

Method 1300 may begin at operation 1301 with receipt of a request to locate a selected node/object within data stream 500. In one embodiment, the request seeks an offset location relative to the start of data stream 500. In this embodiment, data stream 500 represents file system 1000 in which the selected node/object is located. For example, a request may be generated such that backup engine 106 may update a file within a stored backup data stream 500. Backup engine 106 initially must determine the location of the selected object within data stream 500 such that the object may be updated. To determine this location, backup engine 106 locates the position of the selected object/node within a corresponding size tree 1100 as described in further detail below.

Following receipt of the request for the location of the selected object/node within data stream 500, method 1300 sets a total offset value to zero at operation 1302. The total offset value may be stored on backup system 104 or on client 101 as an integer value. The total offset value will be returned at the end of method 1300 and represents the offset location of the selected object/node within data stream 500.

After the offset value is initialized to zero, operation 1303 determines whether the selected object/node referenced in the request received at operation 1301 is the root directory for file system 1000 represented by size tree 1100. If the selection object/node is the root, the total offset value is returned at operation 1304 and method 1300 is completed. Otherwise, method 1300 moves to operation 1305 to further traverse size tree 1100.

At operation 1305, the direct parent for the selected object/node is located in size tree 1100. For example, in FIG. 11 when the selected object/node is "libc.a", the direct parent to file object size node 1102C is cover size node 1101 labeled "lib/". The parent node for the selected object/node may be determined using any tree traversal technique. In one embodiment, operation 1305 uses a depth first or a breadth first search to locate a cover size node 1101 within size tree 1100 that lists the selected object/node as a child.

After locating the direct parent of the selected object/node, operation 1306 adds the sizes of each child node of the parent node to the left of the selected object/node in the size tree 1100 (i.e., preceding the selected object/node in data stream 500) to the current value of the total offset value. For example, when the selected object/node is object size node "libc.a" in size tree 1100 shown in FIG. 11, the value of thirty, corresponding to begin directory object size node 1102A for the cover size node "lib/", is added to the total offset value.

At operation 1307, the selected object/node is set equal to the parent node of the current selected object/node. In the example above, the selected object/node would be set to the "lib/" cover size node 1101 which is the direct parent of file object size node "libc.a" as shown in FIG. 11. Method 1300 thereafter returns to operation 1303 to determine if the selected node is the root directory for the file system represented by size tree 1100. If the selected object/node is the root, the total offset value is returned at operation 1304 and method 1300 is completed. Otherwise, method 1300 moves to operation 1305 to further traverse the size tree as discussed above.

Accordingly, 1300 continues until an offset value for the original selected object/node is calculated and returned. The total offset value may thereafter be used to locate the original selected object in a data stream representing a file system. In this fashion, location of objects within a data stream may be easily determined without the need for completely traversing a backup data stream (e.g., data stream 300 or 500) by using a size tree.

Virtual Full Construction

Synthesizing virtual construction of a backup stream representing a file system tree using a previous data stream and change logs (e.g., delta changes) has become a new standard in backup, as it provides the convenience of full data set protection with improved efficiency. However, current virtual full synthesis still requires complete file system traversal, which is time consuming and resource intensive. With availability of change logs and dynamic offset calculation using a size tree as described above, the efficiency of virtual full construction can be greatly improved by directly applying changes over a previous full backup with minimized content shifting impact.

Figure 14:
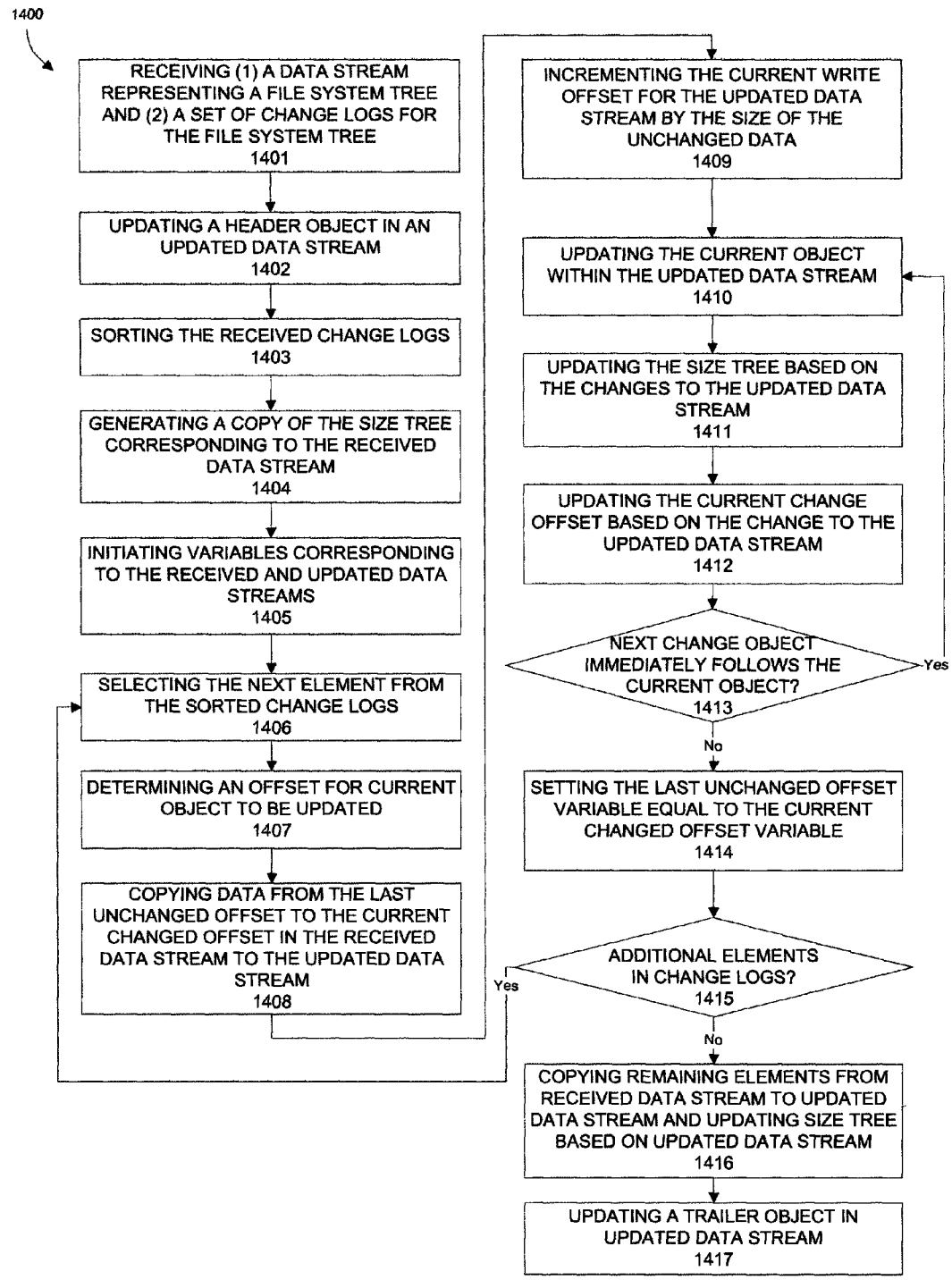
FIG. 14 shows a method for virtual full construction of a data stream based on a previous version of the data stream and a set of change logs according to one embodiment of the invention.

FIG. 14 shows a method 1400 of performing virtual full construction of a data stream based on a previous version of the data stream and a set of change logs. Method 1400 may be performed by one or more components of storage system 100. For example, method 1400 may be performed by one or more of backup client software 105 on client 101 and backup engine 106 on backup system 104.

Method 1400 may begin at operation 1401 with receipt of (1) a data stream representing a file system tree and (2) a set of change logs for the file system tree. In one embodiment, the received data stream may have a similar or identical in structure to data streams 300, 500, and/or 700 described above in relation to FIGS. 2-9. The data stream used for method 1400 may represent any file system tree stored on client 101 or another device. For example, the received data stream may represent the last full backup for the file system tree 1000 shown in FIG. 10 and described above. The change logs represent file and/or directory additions, modifications, and/or deletions to the file system tree represented by the received data stream. In one embodiment, the data stream and change logs may be received by the backup system 104 from the client 101, which will also be used to store an updated data stream after virtual full construction has taken place.

Following receipt of a data stream and a set of change logs, operation 1402 updates a header object in an updated data stream. The updates to the header object may be based on the header object in the received data stream and the change logs that represent changes that will be captured in the updated data stream. In one embodiment, the header object may be similar or identical in format to header objects 302A and/or 502A.

After updating the header object in the updated data stream, operation 1403 sorts the received change logs since the last backup to coalesce changes according to current file system tree traversal order. In one embodiment, directory or file moves within the file system tree may be converted into a deletion operation followed by an insertion operation without physically deleting the moved data. The sorted order of the change logs will be used in the operations to follow such that minimal traversal of the received data stream is necessary to construct the updated data stream.

At operation 1404, a shadow copy of a size tree for the last backup of the file system tree represented by the received data stream is generated. The size tree may be previously generated for the last backup using one or more of the techniques and data structures described above. For example, the size tree may have been previously constructed using method 1200 described above. The shadow copy of the size tree may be stored in storage units 108 or 109 or in cache memory on either backup system 104 or client 101.

At operation 1405, variables, which are used to implement the changes dictated by the sorted change logs, are initiated. In one embodiment, a variable representing the last unchanged offset in the received backup stream (e.g., last_unchanged_offset) and a variable representing the current changed offset in the received backup stream (e.g., current_changed_offset) are set to the first backup object of received data stream. In one embodiment, the first backup object of the received data stream has an offset value of zero (i.e., last_unchanged_offset=0 and current_changed_offset=0). Additionally, the current write offset (e.g., current_write_offset) for the new data stream that will be formed using method 1400 may be set to the beginning of the updated data stream (e.g., current_write_offset=0).

After initialization of data structures and variables, the following operations are continually performed to incrementally incorporate each of the elements of the sorted change logs into the updated data stream. At operation 1406, an element in the sorted change log is selected for processing. As noted above, the change logs have been sorted since the last backup to coalesce changes according to current file system tree traversal order. Object $O_i$ represents the object to be changed based on the selected change log element.

At operation 1407, the size tree that was shadow copied at operation 1403 is used to determine the offset value for the selected object $O_i$. The current changed offset variable (e.g., current_changed_offset) may be set to this offset value, (e.g., current_changed_offset=offset($O_i$)).

At operation 1408, data from the last unchanged offset to the current changed offset in the received data stream is shadow copied for the updated data stream. Synthetic operations that do not require physically moving data may be used to shadow copy unchanged data. At operation 1409, the current write offset (e.g., current_write_offset) for the new data stream may be incremented by the size of the unchanged data copied at operation 1408.

At operation 1410, the new or changed object $O_i$ is added to the updated data stream based on the selected change log element from operation 1406. When the selected change log element represents a new or changed data object, the current write offset variable is updated by the size of new/changed data object. When the selected change log element represents a deletion, new backup data is not generated.

At operation 1411, a new size tree is constructed based on the change performed at operation 1410. In one embodiment, the new size tree may be constructed based on the shadow copied size tree using method 1200 described above. The new size tree may replace the shadow size tree for processing of subsequent change log elements.

At operation 1412, the current change offset is updated based on the change performed at operation 1410. For example, in one embodiment, the current change offset for the received data stream may be incremented by the size of object $O_i$ (e.g., current_changed_offset=current_changed_offset+sizeof($O_i$)). This moved the current changed offset value ahead of the current object $O_i$ for subsequent change operations.

At operation 1413, it is determined whether the next changed object $O_j$ represented by the next change log element immediately follows the current changed object $O_i$. If the next changed object $O_j$ immediately follows the current changed object, method 1400 moves to operation 1410 such that operations 1410-1412 are performed for the object $O_j$ based on the next change log element. Otherwise, at operation 1414 the last unchanged offset variable is set equal to the current changed offset variable (e.g., last_unchanged_offset=current_changed_offset).

At operation 1415, it is determined whether there are any additional elements in the sorted changed log. If there are additional elements to be processed, method 1400 moves to operation 1406 to process these one or more additional changes. Otherwise, operation 1416 is performed. At operation 1416, (1) any remaining unchanged data elements from the received data stream are shadow copied into the updated data stream and (2) the size tree is updated based on the changes performed at operations 1406-1414. Updating the size tree may include generating a new size tree root for object offset calculation and file system traversal.

At operation 1417, a trailer object is updated in the updated data stream. The updates to the trailer object may be based on the trailer object in the received data stream and the change logs that represent changes that are now captured in the updated data stream. In one embodiment, the trailer object may be similar or identical in format to trailer objects 302E and/or 502E.

Figure 15A:
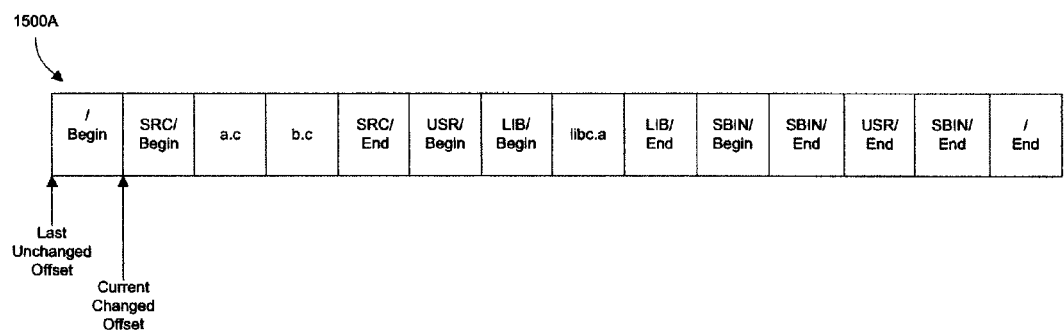
FIGS. 15A and 15B shows a previous and updated data streams according to one embodiment of the invention.
Figure 15B:
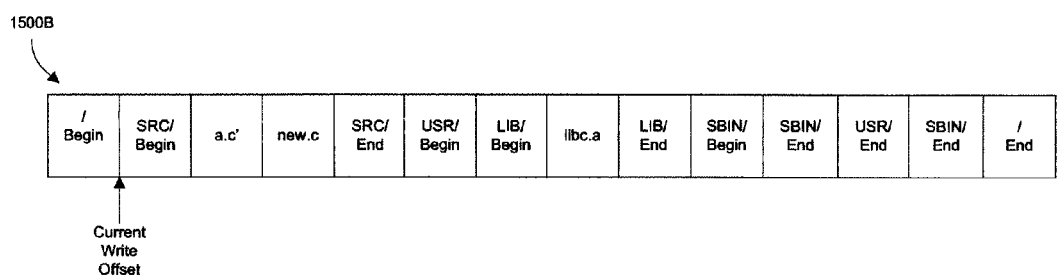

FIG. 15A shows a previous backup data stream 1500A in which the file a.c is to be updated, a new file new.c is to be created, and file b.c is to be deleted. FIG. 15B shows the data stream 1500A after changes have been performed to create updated data stream 1500B. As shown, in FIG. 15B, the shaded objects are changed based on method 1400 such that the above changes may be performed. By constructing an updated data stream based on a previous version of the data stream and a sorted list of change logs, method 400 generates an updated data stream with minimal traversal of the old data stream and with minimal resource utilization.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for virtual full construction of a data stream based on a previous version of the data stream and a set of change logs, the method comprising:
    receiving a data stream representing a file system tree and a set of change logs representing changes to the file system tree since the received data stream was generated;
    sorting elements in the change logs according to a current file system tree traversal order;
    calculating a current offset value for a current object that has been altered based on the change logs within the received data stream, including traversing a size tree corresponding to the file system tree to determine the current offset value of the current object, wherein the size tree includes a plurality of nodes arranged in a hierarchy representing a directory structure of the file system tree, the plurality of nodes including parent nodes and child nodes, wherein each of the child nodes represents one of a plurality objects in the file system tree, and wherein each of the parent nodes includes a total size of one or more child nodes of the parent node, locating a parent node to a selected node in the size tree, and setting the current offset value for the current object equal to the sum of the sizes of the child nodes for the parent node that precede the selected node in the size tree;
    copying unchanged data between a last changed object in the received data stream and the current offset value in the received data stream into an updated data stream;
    updating the current object in the updated data stream based on an element of the sorted change logs; and
    copying any remaining data following the current object in the received data stream to the updated data stream.

2. The computer-implemented method of claim 1, wherein the nodes of the size tree mimics objects in the directory structure of the file system tree to store sizes of the objects, which are utilized to calculate offsets of the objects within the file system tree.

3. The computer-implemented method of claim 2, further comprising generating the size tree, wherein generating the size tree comprises:
    adding a cover size node to the size tree for each directory in the file system tree represented by the received data stream;
    adding a directory begin object size node and a directory end object size node to the size tree for each cover size node, wherein the directory begin object size node is the first child node and the directory end object size node is the last child node for the corresponding cover size node; and
    adding file object size nodes to cover size nodes for each file within a corresponding directory in the file system tree, wherein the file object size nodes are sorted between the directory begin object size node and the directory end object size node according to each file's position in the received data stream representing the data contents of the file system tree.

4. The computer-implemented method of claim 3, wherein each directory begin object size node, directory end object size node, and file object size node is associated with a size value corresponding to a size of an associated element in the data stream.

5. The computer-implemented method of claim 3, wherein each cover size node and object size node includes a name associated with a corresponding element within the file system tree.

6. The computer-implemented method of claim 3, wherein each cover size node includes a listing of each directory begin object size node, directory end object size node, and file object size node dependent from the cover size node.

7. The computer-implemented method of claim 3, wherein each cover size node references directory begin object size nodes, directory end object size nodes, and file object size nodes stored in a continuous size tree data stream.

8. The computer-implemented method of claim 4, further comprising:
    updating a size value of a file object size node whose corresponding element in the received data stream has been updated and changed size.

9. The computer-implemented method of claim 4, wherein the size tree represents the hierarchical structure of the file system tree in which the selected element is located and stores sizes of each element in the file system tree.

10. The computer-implemented method of claim 9, wherein calculating the current offset value for the current object in the received data stream further comprises:
    locating a direct parent of the parent node; and
    adding the sum of the sizes of child nodes for the direct parent of the parent node that precede the parent node in the size tree to the current offset value.

11. A storage system for performing virtual full construction of a data stream based on a previous version of the data stream and a set of change logs, comprising:
    a client for updating a file system tree;
    a backup system generating an updated data stream representing the updated file system tree based on a previous version of the file system tree and a set of change logs, wherein the backup system is configured to:

receive, from the client, a data stream representing the previous version of the file system tree and the set of change logs representing changes to the file system tree since the received data stream was generated;

sort elements in the change logs according to current file system tree traversal order;

calculate a current offset value for a current object that has been altered based on the change logs within the received data stream, including traversing a size tree corresponding to the file system tree to determine the current offset value of the current object, wherein the size tree includes a plurality of nodes arranged in a hierarchy representing a directory structure of the file system tree, the plurality of nodes including parent nodes and child nodes, wherein each of the child nodes represents one of a plurality objects in the file system tree, and wherein each of the parent nodes includes a total size of child nodes of the parent node, locating a parent node to a selected node in the size tree, and setting the current offset value for the current object equal to the sum of the sizes of the child nodes for the parent node that precede the selected node in the size tree;

copy unchanged data between a last changed object in the received data stream and the current offset value in the received data stream into an updated data stream;

update the current object in the updated data stream based on an element of the sorted change logs; and copy any remaining data following the current object in the received data stream to the updated data stream.

12. The storage system of claim 11, wherein the nodes of the size tree mimics objects in the directory structure of the file system tree to store sizes of the objects, which are utilized to calculate offsets of the objects within the file system tree.

13. The storage system of claim 12, wherein the backup system is further configured to:

add a cover size node to the size tree for each directory in the file system tree represented by the received data stream;

add a directory begin object size node and a directory end object size node to the size tree for each cover size node, wherein the directory begin object size node is the first child node and the directory end object size node is the last child node for the corresponding cover size node; and add file object size nodes to cover size nodes for each file within a corresponding directory in the file system tree, wherein the file object size nodes are sorted between the directory begin object size node and the directory end object size node according to each file's position in the received data stream representing the data contents of the file system tree.

14. The storage system of claim 13, wherein each directory begin object size node, directory end object size node, and file object size node is associated with a size value corresponding to a size of an associated element in the data stream.

15. The storage system of claim 13, wherein each cover size node and object size node includes a name associated with a corresponding element within the file system tree.

16. The storage system of claim 13, wherein each cover size node includes a listing of each directory begin object size node, directory end object size node, and file object size node dependent from the cover size node.

17. The storage system of claim 13, wherein each cover size node references directory begin object size nodes, directory end object size nodes, and file object size nodes stored in a continuous size tree data stream.

18. The storage system of claim 14, wherein the backup system is further configured to:

update a size value of a file object size node whose corresponding element in the received data stream has been updated and changed size.

19. The storage system of claim 14, wherein the size tree represents the hierarchical structure of a file system tree in which the selected element is located and stores sizes of each element in the file system tree.

20. The storage system of claim 19, wherein the backup system is further configured to:

locate a direct parent of the parent node; and add the sum of the sizes of child nodes for the direct parent of the parent node that precede the parent node in the size tree to the current offset value.

21. A non-transitory computer-readable storage medium having instructions stored therein, which when executed by a processor perform operations for virtual full construction of a data stream based on a previous version of the data stream and a set of change logs, the operations comprising:

receiving a data stream representing a file system tree and a set of change logs representing changes to the file system tree since the received data stream was generated;

sorting elements in the change logs according to current file system tree traversal order;

calculating a current offset value for a current object that has been altered based on the change logs within the received data stream, including traversing a size tree corresponding to the file system tree to determine the current offset value of the current object, wherein the size tree includes a plurality of nodes arranged in a hierarchy representing a directory structure of the file system tree, the plurality of nodes including parent nodes and child nodes, wherein each of the child nodes represents one of a plurality objects in the file system tree, and wherein each of the parent nodes includes a total size of child nodes of the parent node, locating a parent node to a selected node in the size tree, and setting the current offset value for the current object equal to the sum of the sizes of the child nodes for the parent node that precede the selected node in the size tree;

copying unchanged data between a last changed object in the received data stream and the current offset value in the received data stream into an updated data stream;

updating the current object in the updated data stream based on an element of the sorted change logs; and copying any remaining data following the current object in the received data stream to the updated data stream.

22. The non-transitory computer-readable storage medium of claim 21, wherein the nodes of the size tree mimics objects in the directory structure of the file system tree to store sizes of the objects, which are utilized to calculate offsets of the objects within the file system tree.

23. The non-transitory computer-readable storage medium of claim 22, wherein the operations further comprise generating the size tree, wherein generating the size tree comprises:

adding a cover size node to the size tree for each directory in the file system tree represented by the received data stream;

adding a directory begin object size node and a directory end object size node to the size tree for each cover size node, wherein the directory begin object size node is the first child node and the directory end object size node is the last child node for the corresponding cover size node; and adding file object size nodes to cover size nodes for each file within a corresponding directory in the file system tree, wherein the file object size nodes are sorted between the directory begin object size node and the directory end object size node according to each file's position in the received data stream representing the data contents of the file system tree.

24. The non-transitory computer-readable storage medium of claim 23, wherein each directory begin object size node, directory end object size node, and file object size node is associated with a size value corresponding to the size of an associated element in the data stream.

25. The non-transitory computer-readable storage medium of claim 23, wherein each cover size node and object size node includes a name associated with a corresponding element within the file system tree.

26. The non-transitory computer-readable storage medium of claim 23, wherein each cover size node includes a listing of each directory begin object size node, directory end object size node, and file object size node dependent from the cover size node.

27. The non-transitory computer-readable storage medium of claim 23, wherein each cover size node references directory begin object size nodes, directory end object size nodes, and file object size nodes stored in a continuous size tree data stream.

28. The non-transitory computer-readable storage medium of claim 24, wherein the operations further comprise:

updating a size value of a file object size node whose corresponding element in the received data stream has been updated and changed size.

29. The non-transitory computer-readable storage medium of claim 24, wherein the size tree represents the hierarchical structure of the file system tree in which the selected element is located and stores sizes of each element in the file system tree.

30. The non-transitory computer-readable storage medium of claim 29, wherein calculating the current offset value for the current object in the received data stream further comprises:

locating a direct parent of the parent node; and adding the sum of the sizes of child nodes for the direct parent of the parent node that precede the parent node in the size tree to the current offset value.

\* \* \* \* \*